US011346404B2

(12) United States Patent
Thomas (10) Patent No.: US 11,346,404 B2
(45) Date of Patent: May 31, 2022

(54) COUPLING AND CONTROL ASSEMBLY FOR USE IN A MOTOR VEHICLE (71) Applicant: Means Industries, Inc., Saginaw, MI (US)

(72) Inventor: Steven M. Thomas, Saginaw, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 98 days.

(21) Appl. No.: 16/596,143

(22) Filed: Oct. 8, 2019

(65) Prior Publication Data
US 2020/0109749 A1 Apr. 9, 2020

Related U.S. Application Data (60) Provisional application No. 62/743,218, filed on Oct. 9, 2018.

(51) Int. Cl.
*F16D 41/04* (2006.01)
*F16D 41/12* (2006.01)
*F16D 48/06* (2006.01)
*B60W 10/02* (2006.01)

(52) U.S. Cl.
CPC ............ *F16D 41/04* (2013.01); *B60W 10/02* (2013.01); *F16D 41/125* (2013.01); *F16D 48/064* (2013.01); *F16D 2300/18* (2013.01)

(58) Field of Classification Search
CPC ...... F16D 41/04; F16D 41/125; F16D 48/064; F16D 2300/18; B60W 10/02
See application file for complete search history.

(56) References Cited

U.S. PATENT DOCUMENTS

| 4,050,560 | A | 9/1977 | Torstenfelt |
| 4,056,747 | A | 11/1977 | Orris et al. |
| 4,200,002 | A | 4/1980 | Takahashi |
| 5,052,534 | A | 10/1991 | Gustin et al. |
| 5,070,978 | A | 12/1991 | Pires |

(Continued)

OTHER PUBLICATIONS

International Searching Authority, The International Search Report and the Written Opinion of the International Searching Authority for International Application No. PCT/US2019/55296, dated Dec. 27, 2019.

(Continued)

*Primary Examiner* — Tinh Dang
(74) *Attorney, Agent, or Firm* — Brooks Kushman P.C.

(57) ABSTRACT

A coupling and control assembly for use in a motor vehicle such as a hybrid vehicle is provided. The assembly includes a first coupling face of an engine powertrain component or part supported by the powertrain component for rotation therewith about an axis. The first coupling face has a first set of locking formations. The assembly also includes a coupling member supported on a stationary member of the vehicle. The coupling member has a second coupling face in close-spaced opposition with the first coupling face. The assembly further includes an electromechanical actuator to move a locking element across a gap towards the first coupling face to a coupling position in response to the actuator receiving an electrical control signal. The locking element abuttingly engages one of the locking formations to prevent rotation of the powertrain component in a first direction about the axis in the coupling position.

9 Claims, 5 Drawing Sheets

(56) References Cited

U.S. PATENT DOCUMENTS

| | | |
|---|---|---|
| 5,449,057 A | 9/1995 | Frank |
| 5,486,758 A | 1/1996 | Hammerle |
| 5,678,668 A | 10/1997 | Sink |
| 5,806,643 A | 9/1998 | Fitz |
| 5,918,715 A | 7/1999 | Ruth et al. |
| 5,927,455 A | 7/1999 | Baker et al. |
| 5,954,174 A | 9/1999 | Costin |
| 5,964,330 A | 10/1999 | Organek et al. |
| 5,964,331 A | 10/1999 | Reed et al. |
| 5,979,627 A | 11/1999 | Ruth et al. |
| 5,996,758 A | 12/1999 | Baxter, Jr. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,290,044 B1 | 9/2001 | Burgman et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,814,201 B2 | 11/2004 | Thomas |
| 6,854,577 B2 | 2/2005 | Ruth |
| 7,025,188 B2 | 4/2006 | Lindenschmidt et al. |
| 7,100,756 B2 | 9/2006 | Kimes et al. |
| 7,153,228 B2 | 12/2006 | Fujiu et al. |
| 7,223,198 B2 | 5/2007 | Kimes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,383,930 B2 | 6/2008 | Kimes et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,484,605 B2 | 2/2009 | Pawley et al. |
| 7,661,518 B2 | 2/2010 | Kimes et al. |
| 7,690,492 B2 | 4/2010 | Gooden et al. |
| 7,942,781 B2 | 5/2011 | Kimes |
| 8,007,396 B2 | 8/2011 | Kimes et al. |
| 8,051,959 B2 | 11/2011 | Eisengruber |
| 8,061,496 B2 | 11/2011 | Samie et al. |
| 8,079,453 B2 | 12/2011 | Kimes |
| 8,187,141 B2 | 5/2012 | Goleski et al. |
| 8,196,724 B2 | 6/2012 | Samie et al. |
| 8,268,772 B2 | 9/2012 | Eh et al. |
| 8,272,488 B2 | 9/2012 | Eisengruber et al. |
| 8,276,725 B2 * | 10/2012 | Swales ............... F16D 41/16 192/43.1 |
| 8,286,772 B2 | 10/2012 | Eisengruber |
| 8,418,825 B2 | 4/2013 | Bird |
| 8,491,439 B2 | 7/2013 | Kimes |
| 8,491,440 B2 | 7/2013 | Kimes et al. |
| 8,720,659 B2 | 5/2014 | Pawley |
| 8,813,929 B2 | 8/2014 | Kimes |
| 9,255,614 B2 | 2/2016 | Kimes |
| 9,381,799 B2 | 7/2016 | McGrew, Jr. et al. |
| 9,541,141 B2 | 1/2017 | Kimes et al. |
| 9,638,266 B2 * | 5/2017 | Kimes .................... F16D 27/10 |
| 9,678,266 B2 | 6/2017 | Li et al. |
| 9,719,566 B2 * | 8/2017 | Nobuyasu ............... F16D 1/033 |
| 2004/0159517 A1 | 8/2004 | Thomas |
| 2004/0216975 A1 | 11/2004 | Ruth |
| 2005/0279602 A1 | 12/2005 | Ruth |
| 2006/0021838 A1 | 2/2006 | Kimes et al. |
| 2006/0124425 A1 | 6/2006 | Fetting, Jr. et al. |
| 2006/0169502 A1 | 8/2006 | Kano et al. |
| 2006/0185957 A1 | 8/2006 | Kimes et al. |
| 2006/0249345 A1 | 11/2006 | Ruth |
| 2008/0100715 A1 | 5/2008 | Chang et al. |
| 2008/0185253 A1 | 8/2008 | Kimes |
| 2008/0188388 A1 | 8/2008 | Sidwa et al. |
| 2009/0062058 A1 | 3/2009 | Kimes et al. |
| 2009/0211863 A1 | 8/2009 | Kimes |
| 2009/0233755 A1 | 9/2009 | Kimes |
| 2010/0105515 A1 | 4/2010 | Goleski et al. |
| 2010/0127693 A1 | 5/2010 | Wenzel et al. |
| 2010/0230226 A1 | 9/2010 | Prout |
| 2011/0233026 A1 | 9/2011 | Pawley |
| 2012/0021862 A1 | 1/2012 | Isken, II et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2012/0309575 A1 | 12/2012 | Buffet |
| 2013/0062151 A1 | 3/2013 | Pawley |
| 2013/0172140 A1 | 7/2013 | Potter |
| 2013/0277164 A1 | 10/2013 | Prout et al. |
| 2014/0102844 A1 | 4/2014 | Greene et al. |
| 2014/0190785 A1 | 7/2014 | Fetting et al. |
| 2014/0284167 A1 | 9/2014 | Kimes |
| 2014/0305761 A1 | 10/2014 | Kimes |
| 2014/0338993 A1 | 11/2014 | Van Druten et al. |
| 2015/0000442 A1 | 1/2015 | Kimes et al. |
| 2015/0073672 A1 | 3/2015 | Kawai |
| 2015/0204392 A1 | 7/2015 | Kimes |
| 2016/0265609 A1 * | 9/2016 | Corsetti ................. F16D 41/30 |

OTHER PUBLICATIONS

The International Bureau of WIPO, International Preliminary Report on Patentability for International Application No. PCT/US2019/055296, dated Apr. 8, 2021.

* cited by examiner

COUPLING AND CONTROL ASSEMBLY FOR USE IN A MOTOR VEHICLE

CROSS REFERENCE TO RELATED APPLICATIONS

This application claims the benefit of U.S. provisional application Ser. No. 62/743,218, filed Oct. 9, 2018, the disclosure of which is hereby incorporated in its entirety by reference herein.

TECHNICAL FIELD

This invention generally relates to coupling and control assemblies for use in motor vehicles such as hybrid vehicles which have an internal combustion engine and one or more electric motors.

OVERVIEW

As described in U.S. Pat. Nos. 9,255,614; 9,541,141; and 9,678,266, coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one direction or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission. U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump or valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch," and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is moveable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 4,056,747; 5,052,534; 5,070,978; 5,449,057; 5,486,758; 5,678,668; 5,806,643; 5,918,715; 5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,813,929; 8,491,440; 8,491,439, 8,268,772; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2015/0000442; 2014/0305761; 2013/0277164; 2013/0062151; 2012/0152683; 2012/0149518; 2012/0152687; 2012/0145505; 2011/0233026; 2010/0105515; 2010/0230226; 2009/0233755; 2009/0062058; 2009/0211863, 2008/0100715; 2008/0188388; 2008/0185253; 2006/0124425; 2006/0249345; 2006/0185957; 2006/0021838, 2004/0216975; and 2005/0279602.

Some other U.S. patent documents related to at least one aspect of the present invention includes U.S. Pat. Nos. 9,255,614; 9,541,141; 9,638,266; 8,720,659; 8,418,825; 5,996,758; 4,050,560; 8,061,496; 8,196,724; and U.S. published application Nos. 2014/0190785; 2014/0102844; 2014/0284167; 2012/0021862; 2012/0228076; 2004/0159517; and 2010/0127693.

As used herein, the term "sensor" is used to describe a circuit or assembly that includes a sensing element and other components. In particular, as used herein, the term "magnetic field sensor" is used to describe a circuit or assembly that include a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMC) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing element) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

As well as U.S. Pat. No. 9,381,799, (i.e. '799 patent), hybrid vehicles may be powered by more than one power source. For example, a hybrid electric vehicle may be powered by an internal combustion engine and one or more electric motors. During certain vehicle operating conditions, the internal combustion engine may be disabled so that the one or more electric motors may instead power the hybrid vehicle.

As used herein, the terminology "hybrid vehicle" refers to a vehicle that is powered by a first power source and a second power source that is different from the first power source. For example, the hybrid vehicle may be powered by an internal combustion engine and an electric motor.

Therefore, a hybrid vehicle may be a hybrid electric vehicle (HEV), a plug-in hybrid electric vehicle (PHEV), or an extended range electric vehicle (E-REV), and the internal combustion engine may be useful for automotive vehicles including a passenger car or a sport utility vehicle. However, it is to be appreciated that the internal combustion engine may also be useful for non-automotive applications such as marine and recreational vehicle applications.

The '799 patent discloses a hybrid vehicle including an engine block, a flywheel, and a grounding clutch coupled to the block. The flywheel is rotatable about an axis and includes a spline. The spline has a first tooth and a second tooth spaced apart from the first tooth to define a gap therebetween. The clutch is configured for preventing rotation of the flywheel about the axis and includes a locking pin. The pin is transitionable between a locked position in which the pin is disposed within the gap and abuts the first and second teeth such that the flywheel does not rotate, and an unlocked position in which the pin does not abut the first and second teeth such that the flywheel rotates.

A problem with the '799 patent is that locking is provided when the locking pin precisely fits within a gap between teeth and does not adequately deal with a tooth butt condition and does not provide enough operating modes.

SUMMARY OF EXAMPLE EMBODIMENTS OF THE INVENTION

An object of at least one embodiment of the present invention is to provide a coupling and control assembly having a large number of operating modes to control the rotation of a powertrain component about its axis.

In carrying out the object and other objects of at least one embodiment of the present invention, a coupling and control assembly for use in a motor vehicle and having multiple operating modes is provided. The assembly includes a first coupling face of an engine powertrain component or a part supported by the powertrain component for rotation therewith about an axis. The first coupling face is oriented to face either axially or radially with respect to the axis. The first coupling face has a first set of locking formations. Each of the locking formations defines a first load bearing surface adapted for abutting engagement with a first load bearing surface of a first locking element. The assembly also includes a coupling member supported on a stationary member of the vehicle. The coupling member has a second coupling face in close-spaced opposition with the first coupling face. The second coupling face has a pocket which receives the first locking element and defines a second load bearing surface adapted for abutting engagement with a second load bearing surface of the first locking element. The assembly further includes an electromechanical actuator to move the first locking element across a gap towards the first coupling face to a coupling position in response to the actuator receiving an electrical control signal. The first locking element abuttingly engages one of the locking formations to prevent rotation of the powertrain component in a first direction about the axis in the coupling position.

The powertrain component may be a flywheel rotatable about the axis and the stationary member may be an engine block.

The first and second coupling faces may be oriented to face axially in opposite directions along the axis.

The first and second coupling faces may be oriented to face radially in opposite directions with respect to the axis.

The part may comprise an annular ring having the first coupling face.

The first locking element may comprise an active strut.

A surface of the powertrain component may have the first coupling face.

The assembly may further include a third coupling face having a second set of locking formations and a fourth coupling face in close-space opposition with the third coupling face and having a pocket which receives a second locking element. The second locking element may move across a gap towards the third coupling face to a coupling position to abuttingly engage one of the second set of locking formations to prevent rotation of the powertrain component in a second direction opposite the first direction about the axis.

The assembly may further include a second electromechanical actuator coupled to the second locking element to actively move the second locking member.

The second locking element may be a passive locking element which passively moves.

Further in carrying out the above object and other objects of at least one embodiment of the present invention, a coupling and control assembly for use in a hybrid vehicle having an internal combustion engine and one or more electric motors is provided. The assembly includes a first coupling face of a flywheel of the engine or an annular structure supported by the flywheel for rotation therewith about an axis. The first coupling face is oriented to face either axially or radially with respect to the axis. The first coupling face has a first set of locking formations. Each of the locking formations defines a first load bearing surface adapted for abutting engagement with a first load bearing surface of a first locking element. The assembly further includes a coupling member supported on an engine block of the vehicle. The coupling member has a second coupling face in close-spaced opposition with the first coupling face. The second coupling face has a pocket which receives the first locking element and defines a second load bearing surface adapted for abutting engagement with a second load bearing surface of the first locking element. An electromechanical actuator moves the first locking element across a gap towards the first coupling face to a coupling position in response to the actuator receiving an electrical control signal. The first locking element abuttingly engages one of the locking formations to prevent rotation of the flywheel in a first direction about the axis in the coupling position to disable the engine so that the one or more electric motors may instead power the hybrid vehicle.

The first and second coupling faces may be oriented to face axially in opposite directions along the axis.

The first and second coupling faces may be oriented to face radially in opposite directions with respect to the axis.

The first locking element may comprise an active strut.

A surface of the flywheel may have the first coupling face.

The assembly may further include a third coupling face having a second set of locking formations and a fourth coupling face in close-space opposition with the third coupling face and having a pocket which receives a second locking element. The second locking element may move across a gap towards the third coupling face to a coupling position to abuttingly engage one of the second set of locking formations to prevent rotation of the flywheel in a second direction opposite the first direction about the axis to disable the engine so that the one or more electric motors may instead power the hybrid vehicle.

The assembly may further include a second electromechanical actuator coupled to the second locking element to actively move the second locking member.

The second locking element may be a passive locking element which passively moves.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The following table refers to drawings FIGS. 2-8 and summarizes the six embodiments of a coupling and control assembly constructed in accordance with the present invention:

|  |  | Comments |
|---|---|---|
| Passive-active | | |
| Dual Planar | FIGS. 2, 3a-3c: Passive planar, Active planar | Pockets on ring gear notches on flywheel |
| | FIG. 4: Passive planar, Active radial | 90° Pockets and notches on Ring gear |
| Dual radial | FIG. 5: Passive radial, Active radial | Parallel tracks on OD of ring gear |
| Active-Active | | |
| Dual Planar | FIGS. 6a-6c: Active planar, Active planar | side-by-side notches on ring gear |
| Dual radial | FIG. 7: Active radial, Active radial | Notches on ring OD, Double teeter totter struts |
| | FIG. 8: Active planar, Active radial | 90° notches on Ring gear |

In general, each of the six embodiment comprises a coupling and control assembly (14—FIG. 3C), (114—FIG. 4), (214—FIG. 5), (314—FIG. 6C), (414—FIG. 7), and (514—FIG. 8) for use in a motor vehicle and having multiple operating modes. Each assembly includes a first coupling face (21—FIG. 3C), (121—FIG. 4), (221—FIG. 5), (321—FIG. 6C), (421—FIG. 7), and (521—FIG. 8) either of an engine powertrain component, such as a flywheel, (26—FIG. 3C), (126—FIG. 4), (226—FIG. 5), (326—FIG. 6C), (426—FIG. 7), and (526—FIG. 1) or a part or an annular ring (24—FIG. 3C), (124—FIG. 4), (224—FIG. 5), (324—FIG. 6C), (424—FIG. 7), and (524—FIG. 8) supported by the powertrain component for rotation therewith about an axis. The first coupling face is oriented to face either axially or radially with respect to the axis. The first coupling face has a first set of locking formations (22—FIG. 3C), (122—FIG. 4), (222—FIG. 5), (322—FIG. 6C), (422—FIG. 7), and (522—FIG. 8). Each of the locking formations defines a first load bearing surface adapted for abutting engagement with a first load bearing surface of a first locking element, such as a first strut, (18—FIG. 3C), (118—FIG. 4), (218—FIG. 5), (318—FIG. 6C), (418—FIG. 7), and (518—FIG. 8). Each assembly also includes a coupling member (20—FIG. 3C), (120—FIG. 4), (220—FIG. 5), (320—FIG. 6C), (420—FIG. 7), and (520—FIG. 8) supported on a stationary member of the vehicle. The coupling member has a second coupling face (23—FIG. 3C), (123—FIG. 4), (223—FIG. 5), (323—FIG. 6C), (423—FIG. 7), and (523—FIG. 8) in close-spaced opposition with the first coupling face. The second coupling face has a pocket which receives the first locking element and defines a second load bearing surface adapted for abutting engagement with a second load bearing surface of the first locking element. Each assembly also includes an electromechanical actuator (16—FIG. 3C), (116—FIG. 4), (216—FIG. 5), (316—FIG. 6C), (416—FIG. 7), and (516—FIG. 8) coupled to the first locking element to move the first locking element across a gap towards the first coupling face to a coupling position in response to the actuator receiving an electrical control signal. The first locking element abuttingly engages one of the locking formations to prevent rotation of the powertrain component in a first direction (i.e. CW) about the axis in the coupling position.

Figure 7:
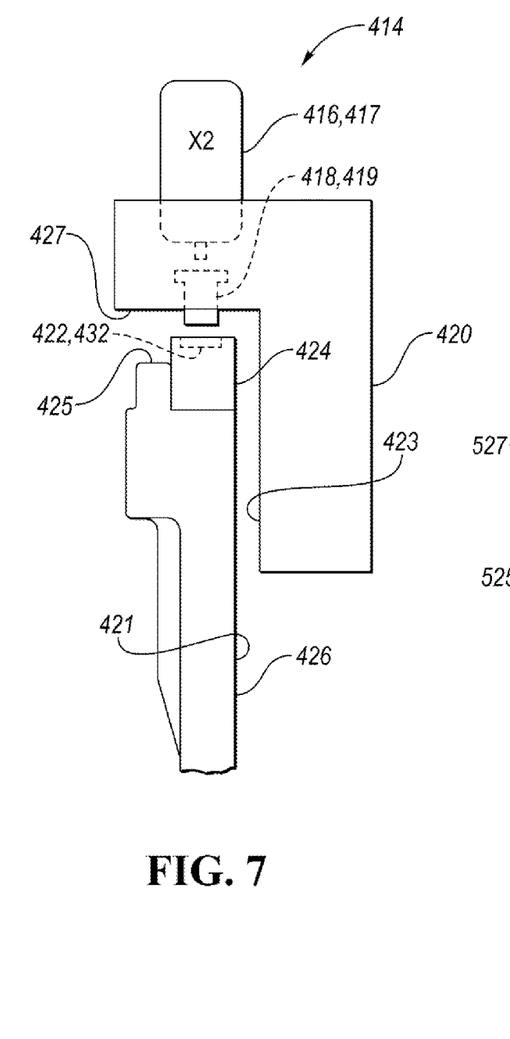
FIG. 7 is a schematic view of a fifth embodiment.
Figure 8:
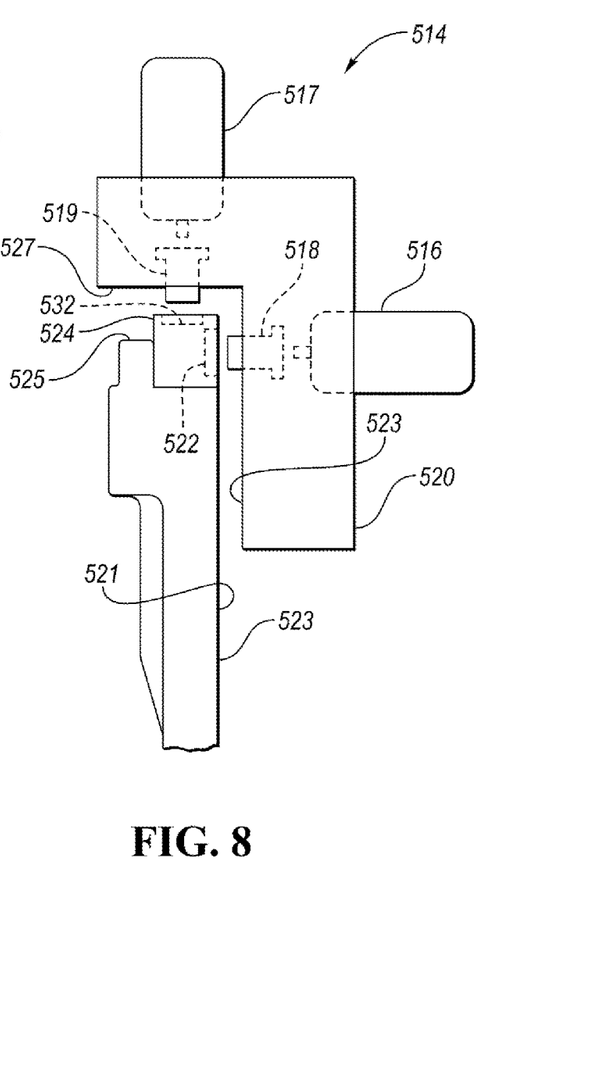
FIG. 8 is a schematic view of a sixth embodiment.

Also, in each of the embodiments, each assembly includes either a third coupling face (25—FIG. 3C), (125—FIG. 4), (225—FIG. 5), (325—FIG. 6C), (425—FIG. 7), and (525—FIG. 8) or another portion of one of the first and second coupling faces having a second set of locking formations (32—FIG. 3C), (132—FIG. 4), (232—FIG. 5), (332—FIG. 6C), (432—FIG. 7), and (532—FIG. 8) and either a fourth coupling face (27—FIG. 3C), (127—FIG. 4), (227—FIG. 5), (327—FIG. 6C), (427—FIG. 7), and (527—FIG. 8) or another portion of the other one of the first and second coupling faces in close-space opposition with either the third coupling face or the other portion of the one of the first and second coupling faces and having a pocket which receives a second locking element, such as a second strut, (30—FIG. 3C), (130—FIG. 4), (230—FIG. 5), (319—FIG. 6C), (419—FIG. 7), and (519—FIG. 8). The second locking element moving across a gap towards either the third coupling face or the other portion of the other one of the first and second coupling faces to a coupling position to abuttingly engage one of the second set of locking formations to prevent rotation of the powertrain component in a second direction (i.e. CCW) opposite the first direction about the axis.

The phrase "active-active" means that both clockwise (CW) and counter-clockwise (CCW) locking elements or struts are actively controlled by the actuator. The phrase "passive-active" means the CW locking element passively disengages with flywheel speed and the CCW element is actively controlled.

In general, the coupling and control assembly of at least one embodiment of the present invention is a subsystem or assembly of a hybrid powertrain and it connects/grounds the engine crankshaft/flywheel to the engine block. The assembly is a modular design consisting of an actuator (i.e. solenoid), a latching mechanism, a position sensor and an electrical connector. The assembly allows free engine rotation in either direction when disengaged and is able to bidirectionally prevent or lock engine rotation when engaged. The assembly allows forward engine motion (CW) when commanded to transition to the disengaged state.

Figure 1:
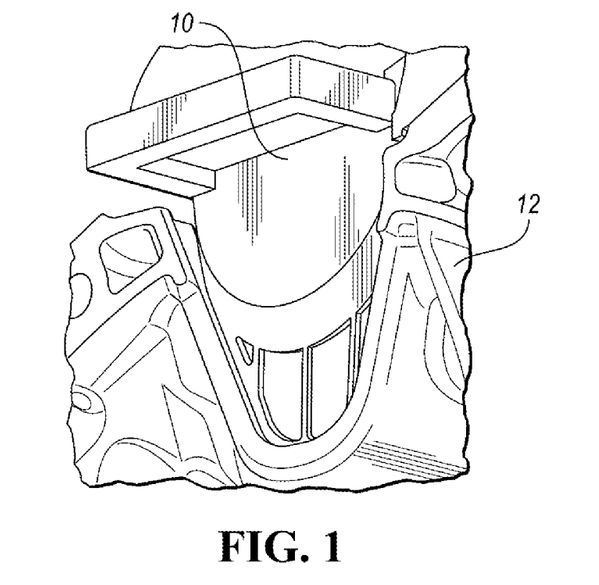
FIG. 1 is a perspective, schematic view, partially broken away, illustrating a starter motor being supported on an internal combustion engine block.
Figure 2:
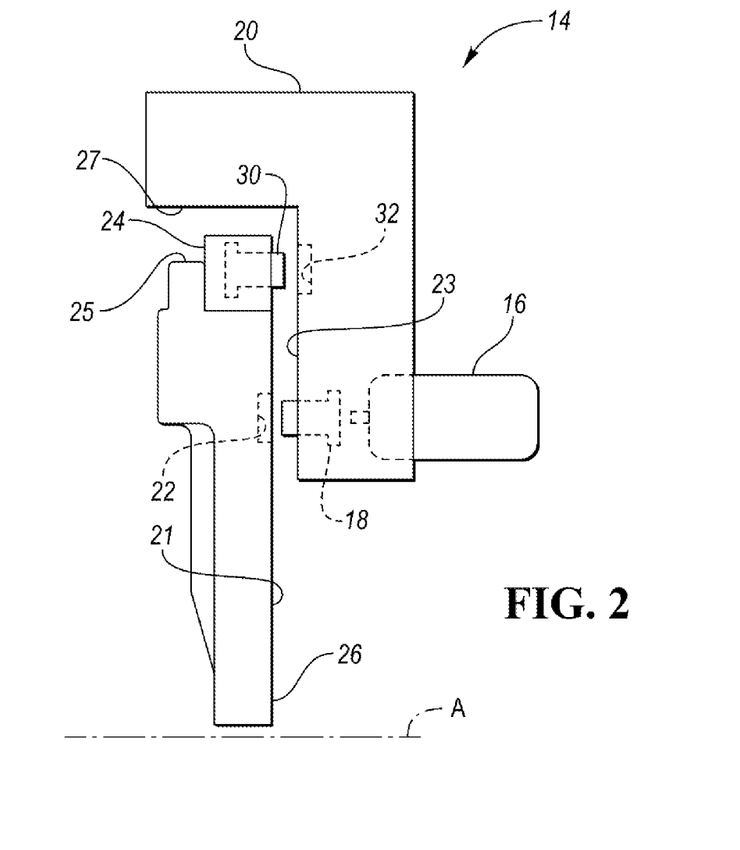
FIG. 2 is a schematic view of a coupling and control assembly constructed in accordance with a first embodiment of the present invention and which is to be located on the engine block of FIG. 1 in place of the starter motor.

FIG. 1 shows a typical position of a starter motor 10 on an engine block 12. A first embodiment of a coupling and control assembly, generally indicated at 14 in FIG. 2, will typically occupy this position. A second embodiment of the assembly is generally indicated at 114 in FIG. 4. A third embodiment is generally indicated at 214 in FIG. 5. A fourth embodiment is generally indicated at 314 in FIG. 6*c*. A fifth embodiment is generally indicated at 414 in FIG. 7. A sixth embodiment is generally indicated at 515 in FIG. 8. In other words, the same or similar parts in each embodiment have the same last two numbers.

Figure 6A:
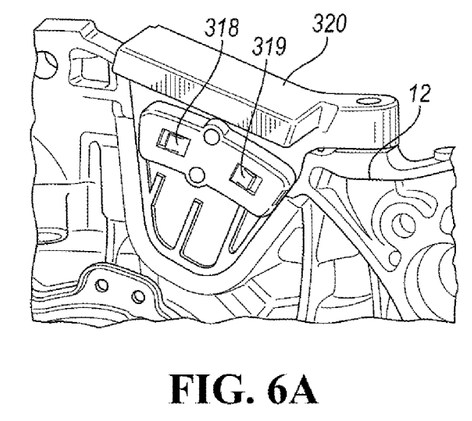
FIGS. 6a and 6b are perspective, schematic front and back views of a fourth embodiment of the assembly supported on the engine block.
Figure 6B:
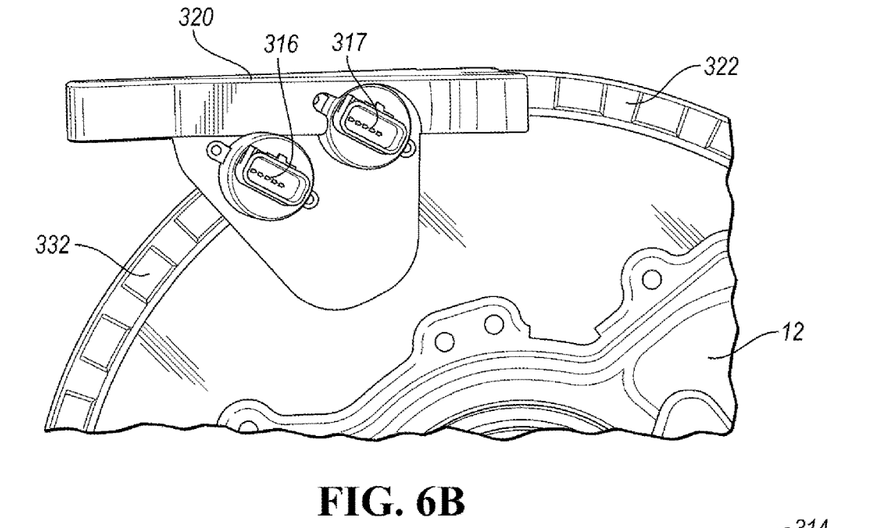
Figure 6C:
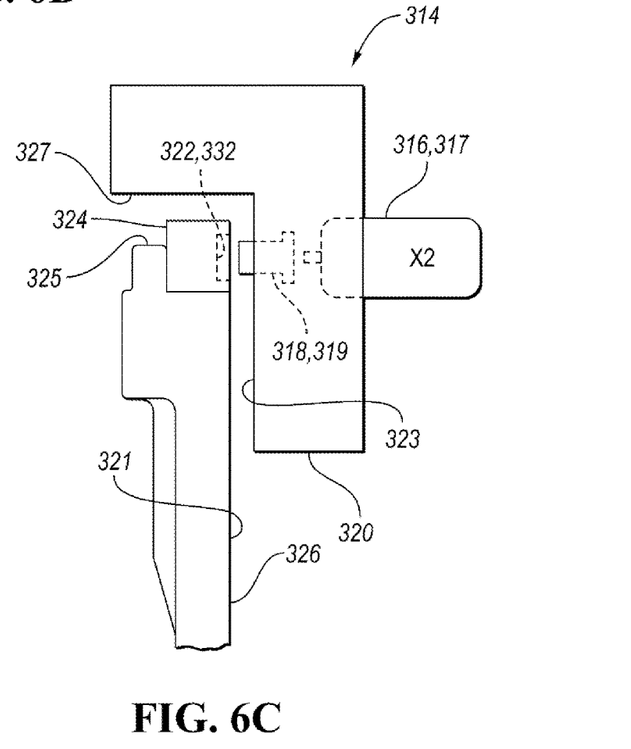
FIG. 6c is a schematic view of the fourth embodiment.

In FIGS. 6A, 6B, and 6C, a pair of side-by-side actuators are shown at 316 and 317 (i.e "x2"). Each of the actuators 316 and 317 drive its respective active strut 318 or 319 supported in pockets within a coupling member 320 located in the starter motor packing space as shown in FIGS. 6A and 6B. When the actuators 316 and 317 are energized, they move their respective struts 318 and 319 into notches 322, 332 formed in an annular ring part 324 supported for rotation on a flywheel 326 about the engine/flywheel axis A of FIG. 2.

In FIG. 7, a pair of active struts 418 and 419 are actively controlled to move by actuators 416 and 417, respectively, to CCW lock and CW lock.

In FIG. 8, a pair of active struts 518 and 519 are actively controlled to move by actuators 516 and 517, respectively.

Figure 3A:
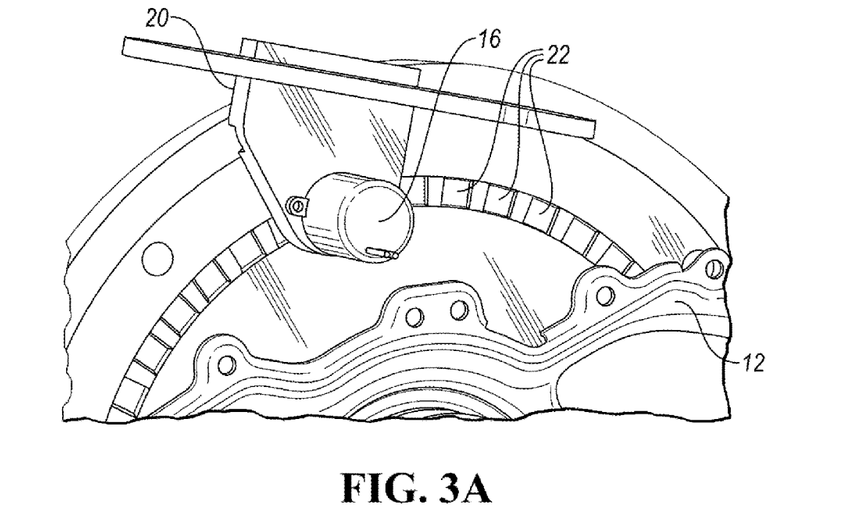
FIGS. 3a and 3b are perspective, schematic front and back views of the assembly of FIG. 2.
Figures 3B, 3C:
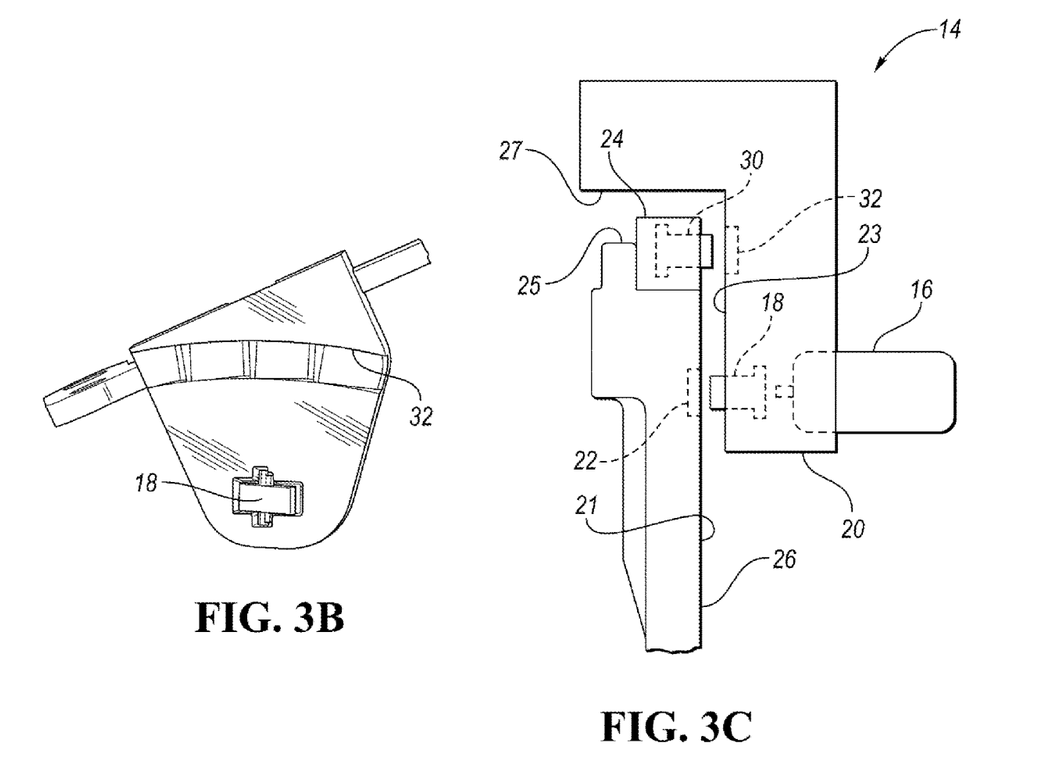
FIG. 3c is a view, similar to the view of FIG. 2, but without the axis of rotation.

In FIGS. 3A-3C, an active strut 18 is actively controlled to move by actuator 16 to CW lock. Passive strut 30 moves passively to CCW lock.

Figure 4:
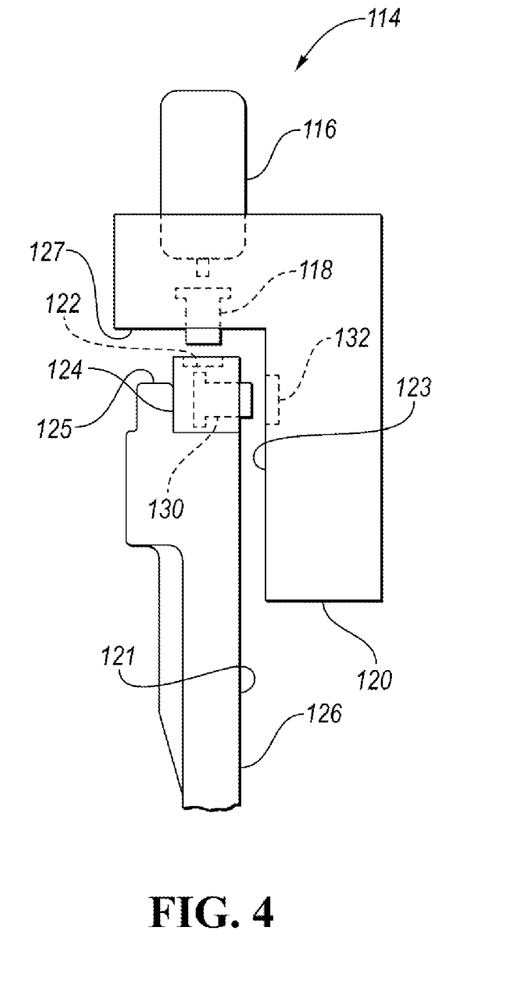
FIG. 4 is a view, similar to the views of FIGS. 2 and 3c, but of a second embodiment of the invention.

In FIG. 4, active strut 118 is actively controlled to move via actuator 116 to CW lock. Passive strut 130 moves passively to CCW lock. Three notches 132 are preferably provided.

Figure 5:
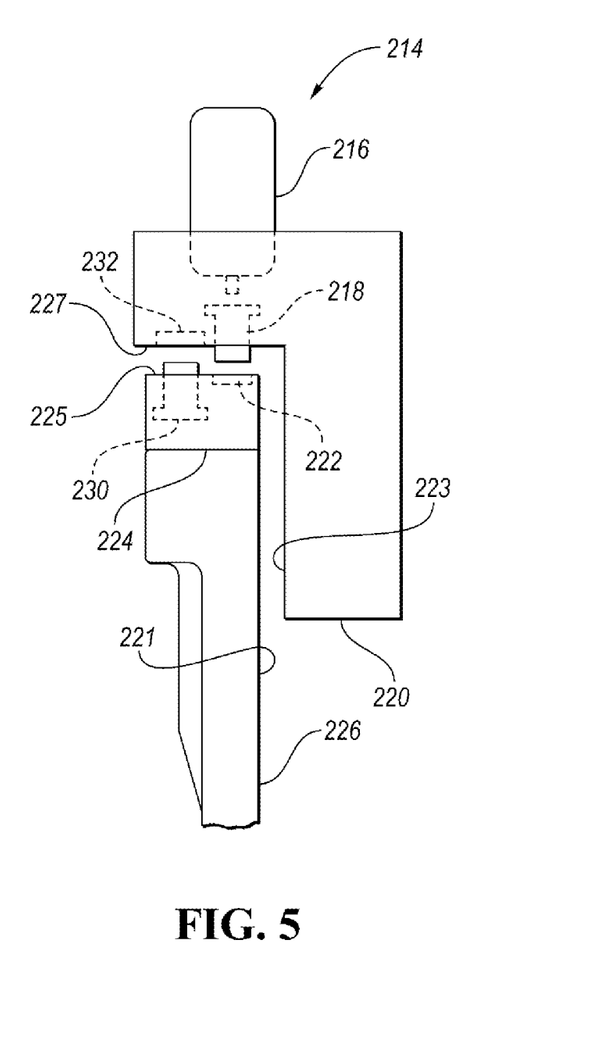
FIG. 5 is a view, similar to the view of FIG. 4, but of a third embodiment.

In FIG. 5, active strut 218 is actively controlled to move via actuator 216 to CW lock. Passive strut 230 moves passively to CCW lock.

In each of the above-noted six embodiments, a magnetic field position sensor (not shown) is located in front of each active strut to provide position feedback to a controller (not shown) of the actuator(s). Also, preferably a spring (not shown) is provided under each of the active and passive struts to bias its strut to its disengaged or engaged positions.

In each of the above-noted six embodiments, the coupling and control assembly is coupled to the engine block and configured for preventing rotation of the flywheel about the axis A when the automatic transmission operates in the electric mode. The assembly may be coupled to the engine block 12 in any manner. For example, the assembly may be bolted to the engine block 12. As such, the assembly may not be rotatable about the axis A, but may rather be fixed to the engine block 12. The assembly may be useful for preventing rotation of the flywheel, while the electric motor provides motive power to the hybrid vehicle. Since the electric motor may drive, i.e., provide motor power to the hybrid vehicle more efficiently when the internal combustion engine is disabled or disengaged, e.g., when the flywheel is stationary and does not rotate, the hybrid vehicle including the assembly may have excellent efficiency. The assembly may be characterized as a coupling configured for connecting and disconnecting a driving component, i.e. flywheel of the internal combustion engine and a driven component, i.e., the automatic transmission.

The assembly may be positioned to occupy a space on the engine block 12 vacated by a non-existent starter mechanism (not shown) for the internal combustion engine. That is, since the hybrid vehicle may not include a conventional starter mechanism for the internal combustion engine, the assembly may be disposed in a location that would be otherwise occupied by the starter mechanism.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly for use in a motor vehicle and having multiple operating modes, the assembly comprising:
a powertrain component supported for rotation in first and second directions about an axis, the powertrain component having a first coupling face oriented to face axially with respect to the axis, a first portion of the first coupling face having at least one first locking formation facing axially with respect to the axis;
a ring gear part supported on a second portion of the first coupling face of the powertrain component for rotation with the powertrain component about the axis, the ring gear part having a first pocket facing axially with respect to the axis, the first pocket having a first locking element received therein;
a coupling member fixed in position on a stationary member of the vehicle, the coupling member having a second coupling face oriented to face axially with respect to the axis;
a first portion of the second coupling face of the coupling member having a second pocket facing axially with respect to the axis, the second pocket having a second locking element received therein, the first portion of the second coupling face of the coupling member being in opposition with the first portion of the first coupling face of the powertrain component;
a second portion of the second coupling face of the coupling member having at least one second locking formation facing axially with respect to the axis, the second portion of the second coupling face of the coupling member being in opposition with the second portion of the first coupling face of the powertrain component;
an actuator, in response to receiving a control signal, to move the second locking element of the coupling member into engagement with one of the at least one first locking formation of the powertrain component to prevent rotation of the powertrain component in the first direction about the axis; and
wherein the first locking element of the ring gear part is biased to move into engagement with one of the second locking formation of the coupling member to prevent rotation of the powertrain component in the second direction about the axis.

2. The assembly as claimed in claim 1, wherein the powertrain component is a flywheel, and the stationary member is an engine block.

3. The assembly as claimed in claim 1, wherein the powertrain component is a flywheel.

4. A coupling and control assembly for use in a vehicle and having multiple operating modes, the assembly comprising:
a powertrain component supported for rotation in first and second directions about an axis, the powertrain component having a first coupling face oriented to face axially with respect to the axis, a first portion of the first coupling face having a first pocket facing axially with respect to the axis, the first pocket having a first locking element received therein;
a ring gear part supported on a second portion of the first coupling face of the powertrain component for rotation with the powertrain component about the axis, the ring gear part having at least one first locking formation facing axially with respect to the axis;
a coupling member fixed in position on a stationary member of the vehicle, the coupling member having a second coupling face oriented to face axially with respect to the axis;
a first portion of the second coupling face of the coupling member having at least one second locking formation facing axially with respect to the axis, the first portion of the second coupling face of the coupling member being in opposition with the first portion of the first coupling face of the powertrain component;
a second portion of the second coupling face of the coupling member having a second pocket facing axially with respect to the axis, the second pocket having a second locking element received therein, the second portion of the second coupling face of the coupling member being in opposition with the second portion of the first coupling face of the powertrain component;

an actuator, in response to receiving a control signal, to move the second locking element of the coupling member into engagement with one of the at least one first locking formation of the ring gear part to prevent rotation of the powertrain component in the first direction about the axis; and wherein the first locking element of the powertrain component is biased to move into engagement with one of the second locking formation of the coupling member to prevent rotation of the powertrain component in the second direction about the axis.

5. The assembly as claimed in claim 4, wherein the powertrain component is a flywheel, and the stationary member is an engine block.

6. The assembly as claimed in claim 4, wherein the powertrain component is a flywheel.

7. A coupling and control assembly for use in a vehicle and having multiple operating modes, the assembly comprising:

a powertrain component supported for rotation in first and second directions about an axis;

a ring gear part supported on the powertrain component for rotation with the powertrain component about the axis, the ring gear part having a first coupling face oriented to face axially with respect to the axis and a third coupling face oriented to face radially with respect to the axis, the first coupling face of the ring gear part having at least one first locking formation facing axially with respect to the axis and the third coupling face of the ring gear part having at least one second locking formation facing radially with respect to the axis;

a coupling member fixed in position on a stationary member of the vehicle, the coupling member having a second coupling face oriented to face axially with respect to the axis and a fourth coupling face oriented to face radially with respect to the axis;

the second coupling face of the coupling member having a first pocket facing axially with respect to the axis, the first pocket having a first locking element received therein, the second coupling face of the coupling member being in opposition with the first coupling face of the ring gear part;

the fourth coupling face of the coupling member having a second pocket facing radially with respect to the axis, the second pocket having a second locking element received therein, the fourth coupling face of the coupling member being in opposition with the third coupling face of the ring gear part;

a first actuator, in response to receiving a first control signal, to move the first locking element of the coupling member into engagement with one of the at least one first locking formation of the ring gear part to prevent rotation of the powertrain component in the first direction about the axis; and a second actuator, in response to receiving a second control signal, to move the second locking element of the coupling member into engagement with one of the at least one second locking formation of the ring gear part to prevent rotation of the powertrain component in the second direction about the axis.

8. The assembly as claimed in claim 7, wherein the powertrain component is a flywheel, and the stationary member is an engine block.

9. The assembly as claimed in claim 7, wherein the powertrain component is a flywheel.

* * * * *